June 17, 1952 M. I. WEINBERG 2,600,712
COLLAPSIBLE BARRIER

Filed June 2, 1949 3 Sheets-Sheet 1

INVENTOR.
MORTON I. WEINBERG,
BY Farley, Forster & Farley
ATTORNEYS.

June 17, 1952     M. I. WEINBERG     2,600,712
COLLAPSIBLE BARRIER
Filed June 2, 1949     3 Sheets-Sheet 2
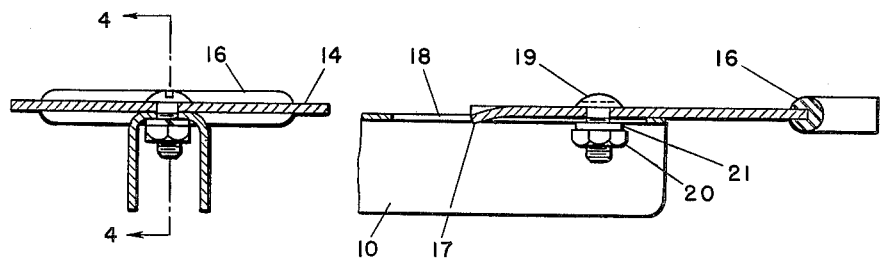
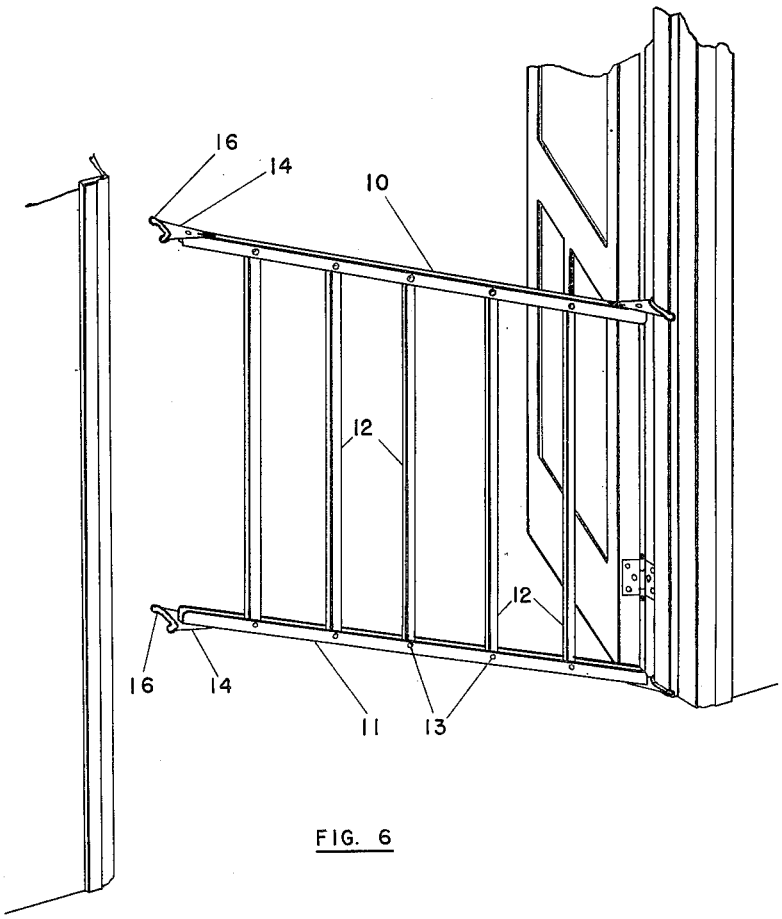
INVENTOR.
MORTON I. WEINBERG,
BY
ATTORNEYS.

June 17, 1952  M. I. WEINBERG  2,600,712
COLLAPSIBLE BARRIER

Filed June 2, 1949  3 Sheets-Sheet 3

INVENTOR.
MORTON I. WEINBERG,
BY Farley Forsbert & Farley
ATTORNEYS.

Patented June 17, 1952  2,600,712

UNITED STATES PATENT OFFICE 2,600,712

COLLAPSIBLE BARRIER

Morton I. Weinberg, Ypsilanti, Mich.

Application June 2, 1949, Serial No. 96,710

3 Claims. (Cl. 160—160)

This invention is related generally to folding or removable fences or gates used in households for preventing passage of small children or large pets through a doorway or stairway.

In the past it has been possible to acquire gates or barriers for doorways or stairways, none of which has been both completely removable on retracting from the opening and collapsible to essentially a single dimension object. It has been customary to use a gate of which the members formed a pantagraph and which was required to be mechanically affixed to one edge of the portal to be guarded and attachable to the other. Thus such a device became an essentially permanent installation in the doorway or stairway in which it was used. Such devices, however, had no statically determinate structural rigidity and, therefore, a scissors-like action occurred when they were deflected out of position that could inflict pain or injury to persons.

It is evident that desirability exists for a fence, gate or barrier for a stairway or doorway that would be positively self-locking on installation and yet be completely removable; that would be readily adjustable to fit standard doorways but not require permanent fittings assembled to such doorway nor in any way mar the attaching surfaces; that would be statically rigid when installed and thus be incapable of inflicting pain or injury by inadvertent motion; and that would be collapsible to such a marked degree that its storage space requirement would not be materially greater than needed for a common household broom.

It is an object of this invention to provide a gate or barrier for a doorway or staircase that is completely removable, leaving no marring or disfiguring or otherwise extraneous fittings in the framing of the opening.

It is another object of this invention to provide a gate or barrier that is immediately collapsible, on removal from its installed or extended position, to a slender structure similar to a pole.

A further object is to provide a barrier of neat and attractive appearance, of sturdy construction capable of withstanding rough usage, yet withal of a simple design that can be manufactured and sold at a relatively low price.

Another object of this invention is to provide a relatively completely collapsible gate or barrier that is statically rigid when installed in position and properly adjusted to fit a doorway or staircase.

Still another object of this invention is to provide a removable gate or barrier for a doorway or stairway that is self-locking, when properly adjusted and installed, to a statically determinate structure of relative rigidity under its design loads; is collapsible to a long, slender member of a principal single dimension; and is also readily adjustable to fit any doorway or stairway, within its capacity for adjustment, immediately on extension into position.

Fig. 3 is a sectional detail of the door jamb gripping member shown in Fig. 2, looking toward the door frame;

Fig. 4 is a section on the line 4—4 of Fig. 3;

Fig. 6 is a perspective view of the barrier partially retracted from its installed position in the doorway.

Figure 1:
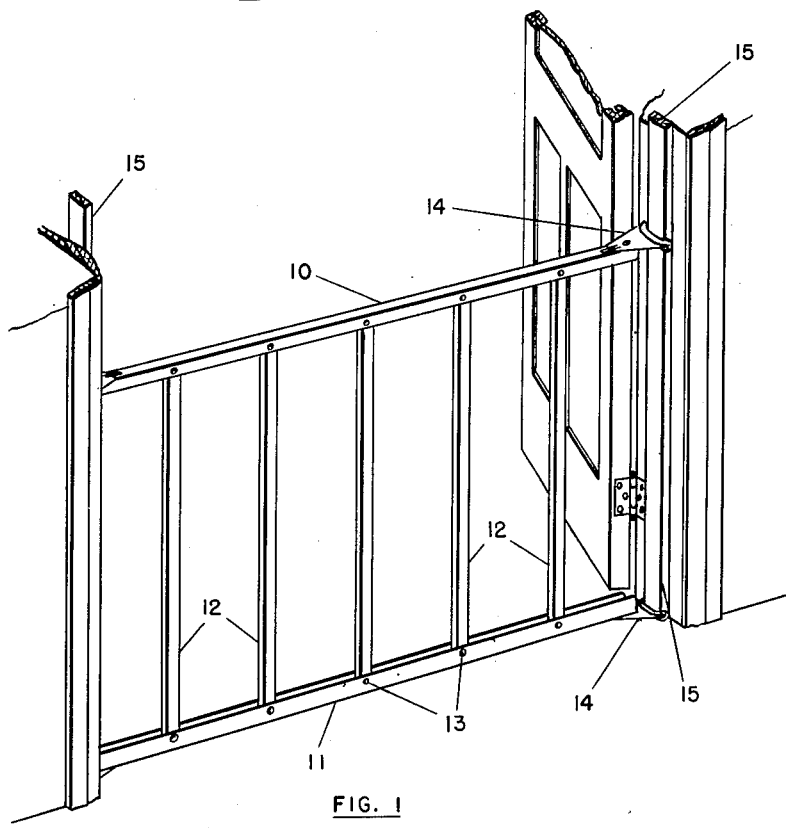
Fig. 1 is a perspective view showing the barrier installed in a standard interior doorway.

As shown in Fig. 1, the barrier consists of upper and lower members 10, 11 preferably formed of sheet metal bent in the form of open channels and arranged with the channels thereof in opposed facing relationship, i. e., with the flanges of the upper member projecting downwardly and the flanges of the lower member projecting upwardly. Projecting into the open channels of the upper and lower members 10, 11 are the ends of a plurality of posts 12 spaced equidistant along the members 10, 11 and pivotally secured thereto by rivets 13 or other suitable securing means.

Figure 5:
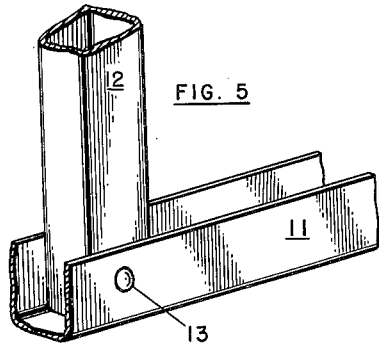
Fig. 5 is a perspective detail showing the typical attachment of the vertical posts to the horizontal channels.

The posts 12, as shown in Fig. 5, are preferably in the form of hollow tubular sheet metal members of rectangular cross section dimensioned to fit neatly but without binding in the channels of the upper and lower members 10 and 11.

Secured to upper and lower faces respectively of the lower and upper members 10, 11 adjacent to each end thereof is a flat plate 14 having its inner end reduced in width to substantially the same width of the members 10, 11, and having its outer end flared and notched to provide a forked end adapted to span the jamb strip 15 of a doorway. This outer forked end of each plate 14 has bonded to it a molded yieldable pad 16, preferably of rubber, which, as shown in Fig. 4, is of circular cross section, for a purpose to be hereinafter more fully set forth.

Figure 2:
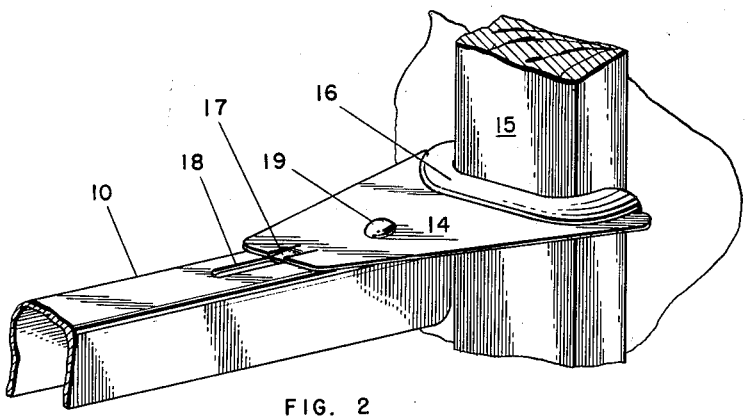
Fig. 2 is an enlarged view of the means of attachment of the barrier to the door jamb strip, and indicating the method of adjustment for doorways of varying widths.

At its inner end each plate 14 has a punched down tang 17 (see Figs. 2 and 4) that projects into an elongated slot 18 formed in the cross web of the channelled shape members 10 and 11 adjacent each end thereof. A screw 19 which passes through a hole in plate 14 and the elongated slot 18, and is provided with a nut 20 and lock washer 21, serves to clamp each of the plates 14 in adjusted position along their respective ends of members 10 and 11, the screws 19 and tangs 17 cooperating to prevent any swivelling or rotative movement of said plates relative to the members 10 or 11.

The manner in which the device operates is as follows:

The members 10 and 11, which are fabricated in suitable lengths for various standard sized doorways, have the plates 14 mounted on the ends thereof with the tang 17 projecting into slot 18 and the plates 14 are securely clamped by nuts 20 and screws 19 so that the overall length between the indented portion of the pads 16 at the ends of each member 10 and 11 is slightly greater than the distance between the opposed faces of the jamb strips 15 of the doorway or other opening in which the barrier is to be placed. The barrier in partially collapsed condition is then inserted in the doorway with the pads 16 at one end of each of the upper and lower member 11 engaged with the jamb strips 15 on one side of the doorway, as shown in Fig. 6, and the other ends of said members are moved downwardly until the pads 16 at the said other ends are forced snugly into tight compressed engagement with the opposite jamb strip, as shown in Fig. 1. As the members 10 and 11 are moved downwardly, the posts 12 rotate upon their pivotal connections 13 to the members 10 and 11 so that when the latter assume substantially horizontal parallel positions the posts 12 will extend vertically. The plates 14 should be so adjusted that when the members 10 and 11 are horizontal the vertically concaved outer face of the rubber pads 16 will be deformed under a high compression force which in effect, due to the resilience of the rubber, is continuously exerted horizontally outwardly against the jamb strip so that the barrier will be wedged and held so tightly in position by frictional force that accidental displacement thereof is impossible.

During the process of installation, as above described, the resilient pads on the upper and lower members at one end of the structure will have been placed in essentially their finally installed location against the jamb strip on one side of the opening, as shown in Fig. 6. These then become the respective centers of rotation of the upper and lower members. As the structure is extended, the upper and lower members approach a horizontal position and remain stress free until the resilient pads on the moving ends engage the opposite jamb strip. Further movement to the horizontal position creates a compression force in the upper and lower members equal to the vertical force required for installation divided by the coefficient of friction of the pad against the jamb strip and the tangent of the angle of the members from the horizontal. Since the tangent of an angle approaches zero as the angle approaches zero, it is evident that a theoretically infinitely high force will exist in the horizontal members. Actually the resiliency of the pads limits this load to a finite adjustable load, this load then becoming the means of self-locking the structure in place. Or stated another way, as the upper and lower members approach their horizontal positions, their free ends, in moving downward to engage the opposite jamb strip, describe an arc of which the radius is equal to the length of such members, the motion being such that the rate of approach of the free ends to the jamb strip is a cosine function of the angle of the members from the horizontal; and since changes in the cosine approach zero as the angle approaches zero, the wedging action on the pads theoretically approaches infinity as the members reach their horizontal positions.

It will, of course, be obvious that in order to obtain the maximum efficiency of the compressive wedging effect just described the plates 14 should be properly adjusted as hereinbefore described. It will also be apparent that with a proper adjustment of said plates and with the members 10 and 11 wedged in position as described, the compression force on the resilient pads is transmitted through the pads to the members 10 and 11 thereby holding said members rigidly in fixed spaced vertical relationship. It will further be observed that when the barrier is wedged in position the entire compressive force is taken up by the members 10 and 11 in such a manner that no turning moment can be exerted upon the pivotal connections 13 of the posts 12 to said members that would tend to collapse the barrier.

As stairway openings are usually wider than standard doorways and as the latter also vary considerably in width, the barriers will naturally be constructed in different widths to accommodate the opening in which each barrier is intended for use. Also it will be obvious that when the barrier is to be used in a stairway opening, suitable retaining strips will of course be provided at the opposed sides thereof.

It will be noted that, when the structure is installed as described in a doorway or similar opening, a series of four bar rectangular linkages are formed, the vertical sides of each rectangle being formed by adjacent posts 12 and the horizontal sides by the short portions of the upper and lower members extending between the pivotal connections 13 of adjacent posts 12.

By using sheet metal, preferably aluminum alloy, formed into channel sections for the upper and lower members 10 and 11, these members have a resulting great rigidity capable of resisting lateral deformation under any strains to which the structure will be subjected in ordinary usage. The channelled sections also serve to provide a much more efficient pivotal connection for the posts 12 to the upper and lower members than is possible when flat strips such as are commonly used are employed. The combination of the tubular sheet metal posts 12 with the channelled upper and lower members results in providing efficient spaced bearing points for the rivets 13 or other pivotal connecting means employed, and hence such spaced bearings, together with the bracing effect of the inner faces of the side walls of the channelled upper and lower members 10 and 11, effectively prevent any sidesway or relative lateral movement between the parts, such as characterizes the usual pantograph-type barriers which sidesway produces the scissors-like movements of the parts thereof that cause painful injuries to the small children they are intended to protect.

The use of sheet metal for the channelled members 10 and 11 as well as for the tubular posts 12, in addition to achieving a more rigid, non-readily deformable structure, also has the advantage of providing rounded, smooth corners on the exterior surfaces of the members 10, 11 and posts 12 naturally formed in the ordinary fabrication of such sections. In addition, the parts preferably being formed of a non-corrosive sheet metal such as aluminum or stainless steel, the structure may readily be cleaned by wiping with a damp cloth, does not require any painting or other upkeep, and there can be no danger of splinters such as are prevalent with wooden barriers of the type heretofore commonly employed.

Figure 7:
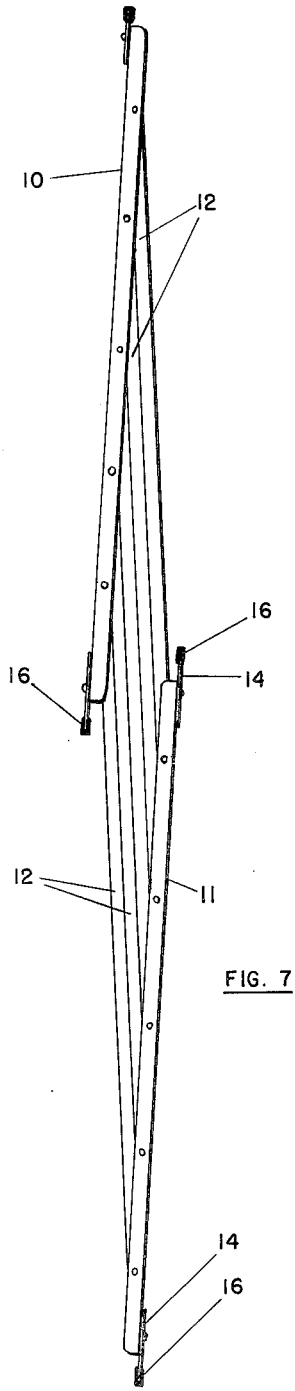
Fig. 7 is a front view of the barrier in the completely collapsed configuration and ready for storage.

When it is desired to remove the barrier, one side thereof is raised from the installed position shown in Fig. 1 to a position such as shown in Fig. 6, thus disengaging the padded forked ends of the plates 14 at one end of the members 10, 11 from one door jamb strip, after which the plates 14 at the other end of said members can readily be disengaged from the other jamb strip and the structure may then be fully collapsed to the position shown in Fig. 7 in which it will be noted that the posts 12 have been swung on their pivotal connections 13 until they are partially telescoped into the channels of the members 10 and 11 and, in contacting parallel engagement, the device when so collapsed then being in the form of an elongated pole-like structure that can readily be stored in a minimum space in any average broom or other closet.

While I have described a satisfactory constructional example that has proven highly satisfactory in actual use, it will be understood that many changes, variations and modifications thereof may be resorted to without departing from the spirit of the invention as set forth in the claims hereunto appended.

I claim:

1. A collapsible removable barrier for use in a doorway or other opening having opposed spaced vertically extending retaining strips at each side thereof comprising upper and lower horizontal metal members each having a pair of vertical flanges arranged in opposed spaced facing relationship to define an open channelled substantially rigid structural shaps, a plurality of spaced rigid tubular sheet metal posts projecting at their ends into said channels, means for pivotally connecting said posts to said flanges, and each of said horizontal members having a pad of yieldable resilient material secured to each end thereof for engagement with said retaining strips so that, when the pads at one end of said horizontal members are engaged with the retaining strip at one side of said opening with said barrier partially collapsed, said pads at the other ends of said members will serve as centers of rotation for said horizontal members and downward force exerted on the upper of said horizontal members will be communicated through said tubular posts to said lower horizontal member to cause said barrier to be extended and as said members approach the horizontal to cause the pads on the other ends thereof to move into engagement with the opposed retaining strip with a rate of approach which is a cosine function of the angle of said members from the horizontal whereby a theoretically infinite wedging action on said pads to compress the same is effected to hold said barrier firmly fixed in extended position in a substantially rigid statically determinate form in tight wedging engagement with said retaining strips.

2. A collapsible removable barrier for use in a doorway or other opening having opposed spaced vertically extending retaining strips at each side of said opening, comprising upper and lower rigid channel-section sheet-metal members, a plurality of rigid tubular sheet-metal posts of rectangular cross section having their upper and lower ends projecting into and fitting neatly within the channels of said upper and lower members to be so masked thereby that there are no exposed overlapping portions of said posts and members, said posts and members having smooth rounded corners along their longitudinal edges, and means for pivotally connecting said posts in spaced relationship adjacent to their ends to the channel side walls of said members, whereby said barrier may be manipulated to and from a collapsed condition in which said posts are arranged in contacting substantially parallel engagement to an extended condition in which said posts extend at right angles to said members, a resilient pad having a vertically concaved outer surface mounted on each end of said upper and lower members adapted when said barrier is moved to fully extended position to be forced with a theoretically infinite wedging action against said retaining strips and thereby serve as the sole means to hold said barrier against accidental displacement in said opening in a substantially rigid statically determinate form.

3. A collapsible removable barrier for use in a doorway or other opening having opposed spaced vertically extending retaining strips at each side of said opening, comprising upper and lower rigid channel-section sheet-metal members, a plurality of rigid tubular sheet-metal posts of rectangular cross section having their upper and lower ends projecting into and fitting neatly within the channels of said upper and lower members to be so masked thereby that there are no exposed overlapping portions of said posts and members, said posts and members having smooth rounded corners along their longitudinal edges, and means for pivotally connecting said posts in spaced relationship adjacent to their ends to the channel side walls of said members, whereby said barrier may be manipulated to and from a collapsed condition in which said posts are arranged in contacting substantially parallel engagement to an extended condition in which said posts extend at right angles to said members, a plate having its inner end adjustably connected for longitudinal sliding but nonrotatable movement adjacent to each end of each of said upper and lower members and having a yoke-shaped outer end with a pad of resilient material bonded thereto for straddling engagement with said retaining strips whereby, when said barrier is in partially collapsed condition and the pair of resilient pads at one end of said horizontal members are simultaneously engaged with the retaining strip at one side of said opening, said pads will serve as centers of rotation for said horizontal members and downward force exerted on the upper one thereof will be communicated through said tubular posts to said lower horizontal member to cause said barrier to be extended and cause the pads at the other ends of said members to straddlingly engage the other retaining strip, and when said members approach the horizontal, to cause said pads to be held with a theoretically infinite wedging action against said retaining strips and thereby act as the sole means to hold said barrier firmly fixed against accidental displacement in said opening in a substantially rigid statically determinate form.

MORTON I. WEINBERG.

REFERENCES CITED

The following references are of record in the file of this patent:

UNITED STATES PATENTS

| Number | Name | Date |
|---|---|---|
| 404,007 | Ladd | May 28, 1889 |
| 570,713 | Pardee et al. | Nov. 3, 1896 |
| 850,969 | Rohrer | Apr. 23, 1907 |
| 958,481 | Drinkwater | May 17, 1910 |
| 2,348,561 | Mutch | May 9, 1944 |